(12) United States Patent
Lindner et al.

(10) Patent No.: US 7,069,201 B1
(45) Date of Patent: Jun. 27, 2006

(54) APPARATUS FOR USE IN AN INDUSTRIAL PROCESS AND PLANT INCLUDING SUCH APPARATUSES AS WELL AS METHOD FOR SIMULATING OPERATION OF SUCH A PLANT

(75) Inventors: Klaus-Peter Lindner, Steinen (DE); Erich Georg, Usingen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/415,815

(22) Filed: Oct. 12, 1999

(30) Foreign Application Priority Data

Oct. 29, 1998 (EP) .................................. 98120182

(51) Int. Cl.
*G06G 7/48* (2006.01)
*G09B 19/00* (2006.01)

(52) U.S. Cl. .......................................... 703/6; 434/118
(58) Field of Classification Search ................... 700/6, 700/7, 9, 29, 30, 31; 703/6; 434/118
See application file for complete search history.

(56) References Cited

U.S. PATENT DOCUMENTS 3,919,720 A * 11/1975 Alliston ........................ 444/1
4,613,952 A * 9/1986 McClanahan ................ 364/578
4,815,014 A * 3/1989 Lipner ......................... 364/550
4,998,051 A * 3/1991 Ito ............................... 318/632

(Continued)

FOREIGN PATENT DOCUMENTS

| EP | 375786 | 7/1990 |
| EP | 435188 | 7/1991 |
| EP | 0809162 | 11/1997 |
| FR | 2 724 744 | 3/1996 |
| GB | 2 284 906 | 6/1995 |
| JP | 11-045102 | 7/1997 |
| WO | WO 97/12301 | 4/1997 |

OTHER PUBLICATIONS

Handbook of Simulation: Principles, Methodology, Advances, Applications, and Practice, by Jerry Banks (Editor), John Wiley & Sons, Inc., ISBN: 0-471-13403-1, Aug. 1998, pp. 6-7, 32-33, 36, 397-398, 409, 524, 547, and 765.*

(Continued)

*Primary Examiner*—Paul L. Rodriguez
*Assistant Examiner*—Dwin M. Craig
(74) *Attorney, Agent, or Firm*—Bacon & Thomas

(57) ABSTRACT

Memorized in an apparatus (10, 12, 14) for use in an industrial process, connectable to a central control unit (18) via a bus (16) for communicating data and control signals, is a software apparatus model (20, 22, 24) which contains a comprehensive mimic image of the apparatus including its parameters, functionality and sequence programs.

10 Claims, 2 Drawing Sheets

U.S. PATENT DOCUMENTS

| | | | |
|---|---|---|---|
| 5,093,608 | A | 3/1992 | Kono et al. |
| 5,208,743 | A | 5/1993 | Nishikawa |
| 5,436,855 | A * | 7/1995 | Willafys et al. ............... 703/6 |
| 5,486,995 | A * | 1/1996 | Krist ........................ 364/149 |
| 5,528,752 | A | 6/1996 | Kise et al. |
| 5,617,321 | A | 4/1997 | Frizelle et al. |
| 5,659,467 | A | 8/1997 | Vickers |
| 6,076,652 | A * | 6/2000 | Head ..................... 198/341.07 |
| 6,278,899 | B1 * | 8/2001 | Piche ........................ 700/44 |

OTHER PUBLICATIONS

The Computer Science and Engineering Handbook, by Allen B. Tucker, Jr. (Editor-in-chief), CRC Press, ISBN: 0-8493-2909-4, 1996, pp. 88, 1919, and 2171.*

Advanced Microprocessors, by Daniel Tabak, McGraw-Hill, Inc., ISBN 0-07-062843-2, 1995, pp. 43-45.*

Advanced Microprocessors, by Daniel Tabak, McGraw-Hill, Inc., ISBN 0-07-062843-2, 1995, pp. 1-49.*

Perry's Chemical Engineer's Handbook, Seventh Edition, 1997, pp. 8-4 to 8-11, and 8-34, and 8-35.*

Rodger McHaney, "Bridging the gap: Transferring logic from a simulation into an actual system controller" 1988 Winter Simulation Conference, pp. 583-590.*

S. Manivannan, Jerry Banks, "Real-Time Control of a Manufacturing Cell Using Knowledge-based Simulation" 1991 Winter Simulation Conference, pp. 251-260.*

S. Manivannan, Jerry Banks, "Towards a Realtime Knowledge-Based Simulation System for Diagnosing Machine Tool Failure", 1990 Winter Simulaton Conference, pp. 603-608.*

A. Barnikow, et al., *Dictum: Decision support system for analysis and synthesis of large-scale systems. Part I: Components*. Computers in Industry 135-144 (Feb. 1992).

* cited by examiner

APPARATUS FOR USE IN AN INDUSTRIAL PROCESS AND PLANT INCLUDING SUCH APPARATUSES AS WELL AS METHOD FOR SIMULATING OPERATION OF SUCH A PLANT

BACKGROUND OF THE INVENTION

The invention relates to an apparatus for use in an industrial process in which for communicating data and control signals it is connectable to a central control unit via a bus. The invention relates furthermore to a plant including such apparatuses as well as to a method for simulating such a plant.

Nowadays, complex processes and process sequences, e.g. in operating a large industrial plant are automated. Usually, in any such plant very many apparatuses, for instance sensors, actors, valves, pumps and the like are connected via a bus to a central control unit (PC or process control system) which controls the apparatuses. In this respect one point essential for the safety and reliable functioning of the plant is the behaviour of each and every apparatus and how each interacts with the other. It is currently usual to prepare a specification for each apparatus, which is loaded into the central control unit to inform it as to the functionality and parameters of the apparatus. However, this specification is incomplete and not suitable to provide the central control unit with a comprehensive mimic image of the apparatus concerned. Plants in which apparatuses are used for which these incomplete apparatus specifications exist as loaded into the central control unit can thus be tested only on-line and also the overall behaviour of the plant resulting from how the individual apparatuses interact can only be tested and analyzed with the apparatuses on-line.

SUMMARY OF THE INVENTION

The invention is based on the object of providing an apparatus of the aforementioned kind which is equipped so that it enables the central control unit to simulate operation of the apparatus as if it really were on-line with the central control unit via the bus. Furthermore, it is intended to provide a plant with such apparatuses, the overall behaviour of which can be simulated in the central control unit. It is still a further intention to provide a method for simulating such a plant.

The apparatus in accordance with the invention is characterized in that in the apparatus a software apparatus model is memorized which contains a comprehensive mimic image of the apparatus including its parameters, functionality and sequence programs.

The plant in accordance with the invention is characterized in that the apparatus models are loadable into the control unit, that in the control unit a software program is provided with the aid of which in using the loaded apparatus models the operation of the plant can be simulated for testing it in including all parameters and functionalities contained in the apparatus model.

The method in accordance with the invention is characterized by it comprising the steps of loading apparatus models of the apparatuses to be employed in the plant into the central control unit and simulating the operation of the plant in including all parameters and functionalities contained in the apparatus models by means of a software program sequenced in the control unit.

BRIEF DESCRIPTION OF THE DRAWINGS

The invention will now be explained by way of an example with respect to the drawings in which.

DETAILED DESCRIPTION OF THE INVENTION

Figure 1:
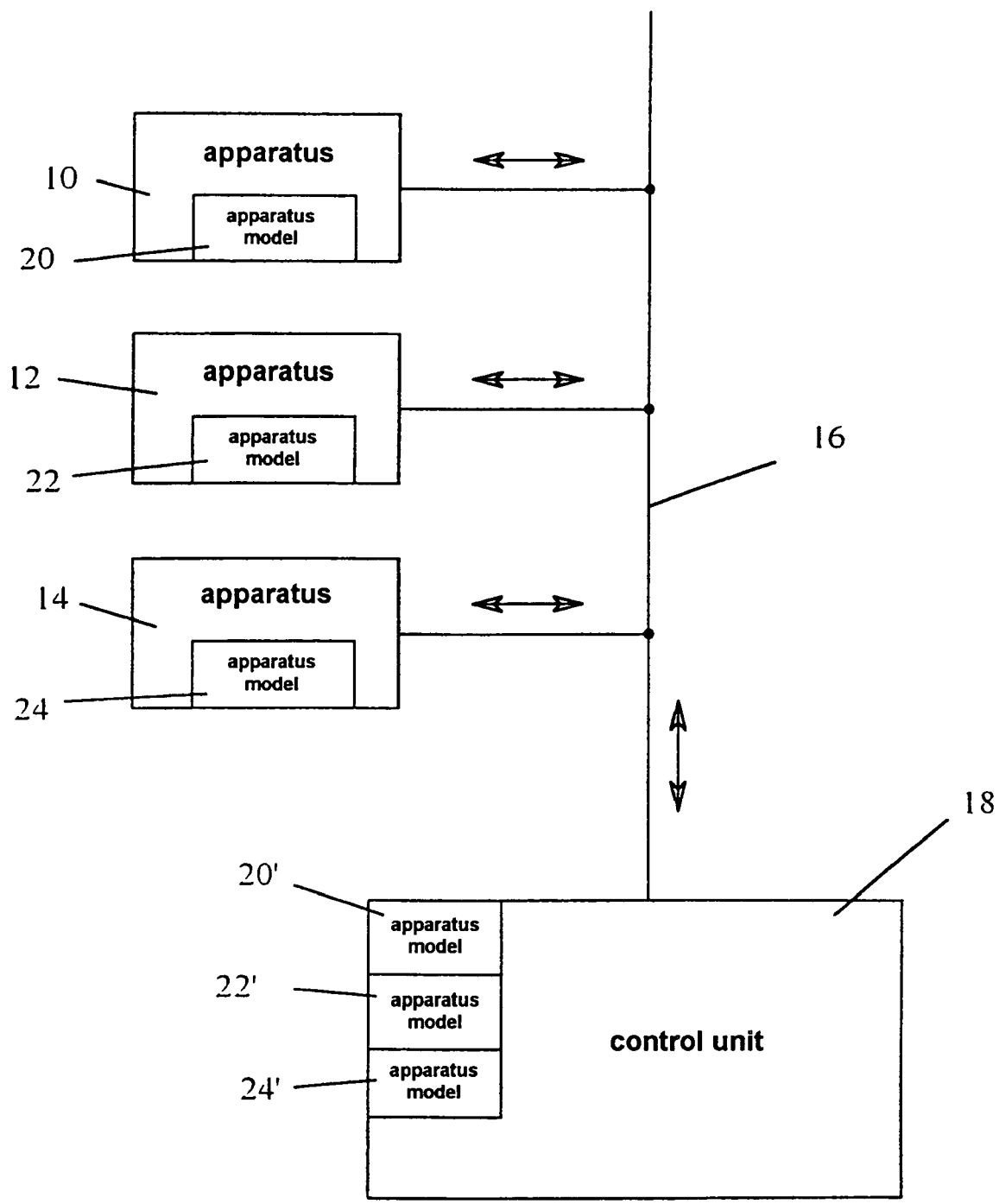
FIG. 1 is a schematic diagram illustrating a plant including apparatuses in accordance with the invention.

Referring now to FIG. 1 there is illustrated the plant comprising, for example, three apparatuses 10, 12 and 14 connected to a central control unit 18 via a bus 16. The apparatuses involved may be sensors, actors, valves, pumps, etc. Each apparatus 10, 12, 14 has associated therewith an apparatus model 20, 22 and 24 resp. including memory containing all information relevant to the apparatus, i.e. all parameters, apparatus functionality as well as the programs and sequence specification contained in the apparatus. Each apparatus model is thus a comprehensive mimic image of the real apparatus so that when making use of a corresponding software program, work can be done with the apparatus model just the same as with the real apparatus.

The apparatus models can be loaded into the central control unit 18, this being indicated by 20', 22' and 24'.

Figure 2:
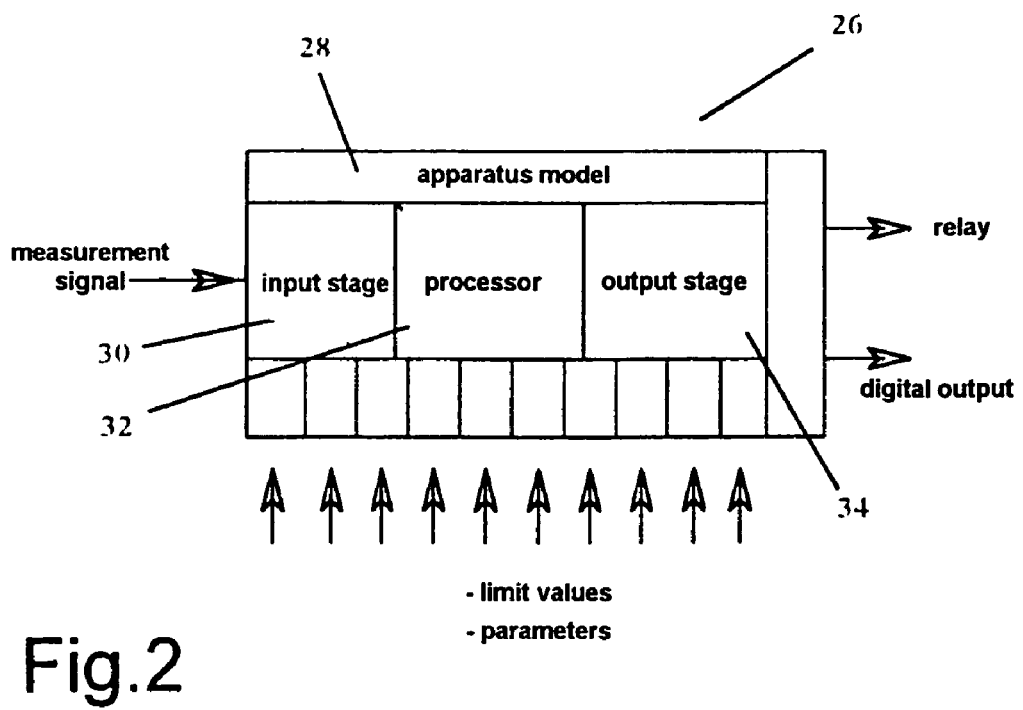
FIG. 2 is a schematic diagram illustrating a measuring apparatus including its essential elements and FIG. 3 is an illustration of one example application of the invention.

Referring now to FIG. 2 there is illustrated schematically a measuring apparatus 26, including its essential units, equipped with an apparatus model. This measuring apparatus receives at an input stage 30 a measurement signal which is processed in a processor 32 in taking into account input parameters and limit values to then output via an output stage 34 digital data to the bus 16 for communication to the central control unit 18 or also generates an output signal which directly activates a relay. The apparatus model 28 memorized in the measuring apparatus 26 can be loaded into the central control unit 18 which then specifies a dedicated measurement signal profile and simulate the behaviour of the measuring apparatus 26 on the basis of the apparatus model 28, it thereby simulating the total sequence from measurement signal receival via processing of the measurement signal up to output of the measured value and/or signalling a relay. Processing the measurement signal is specified by the parameters and the functionalities. In regular operation of the measuring apparatus processing the measurement signal is done, of course, with respect to the parameters and functionalities in the processor thereof by programs and/or sequence definitions being processed.

When several such apparatuses including apparatus models memorized therein and the corresponding software program are put to the use in the central control unit 18 a total plant can be conceived and behaviour simulated. How the many different apparatuses react to each other in this arrangement may also be simulated in particular, thus making it possible to mimic procedurally highly critical situations in the process, and the settings and operability of all apparatuses as well as their satisfactory interaction can be tested.

Figure 3:
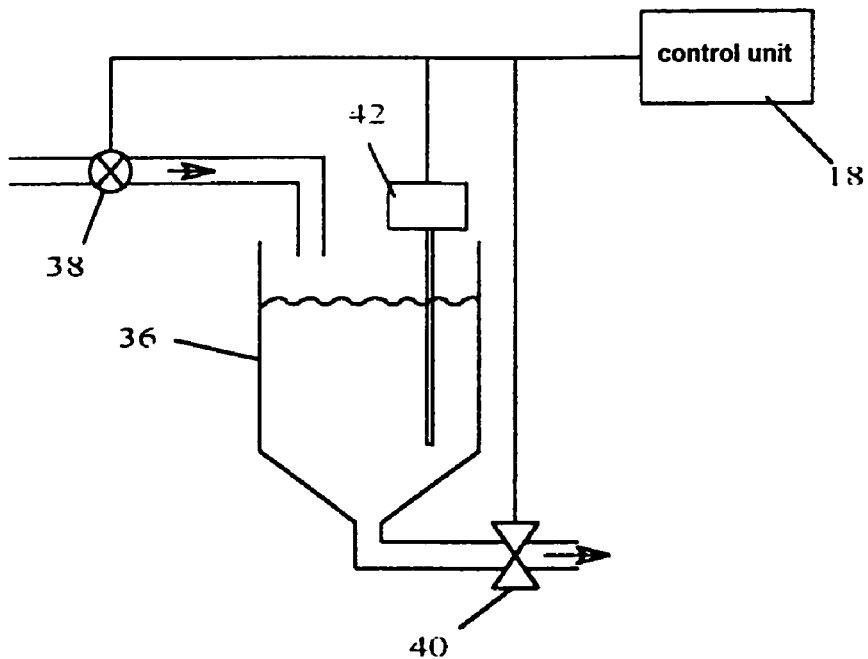

Referring now to FIG. 3 there is illustrated schematically an application indicating it is also possible to considerably shorten iterative processes in setting the measuring apparatuses, an example of which is a vessel 36 to be filled at the top by means of a pump 38 and emptied at the bottom via a discharge closed off by means of an adjustable valve 40, a measuring apparatus 42 dictating the material level in the vessel 36. From the simulation by means of the apparatus model memorized in the measuring apparatus 42 and loadable into the control unit 18 it can be recognized directly whether the pump 38, for example, supplies more material than is discharged via the valve 40 so that the valve 40 needs to be opened at a lower material level. When this problem is "seen" in simulation and all relevant variables have been defined, the dimensioning thereof can be undertaken for the desired correct behaviour.

The apparatus models 20, 22, 24, 28 may also be used for simulation as independent simulation modules, e.e. held in a data base, it, of course, also being possible to memorize these apparatus models on data carriers which are loaded into the central control unit 18.

Preferably, however, the apparatus models are held in the corresponding apparatuses and the connection to the central control unit is made via the bidirectional bus, the central control unit then acting like a simulation processor as influenced by the corresponding software program in simulation.

Should it turn out in simulation that the parameters contained in the apparatus model are unfavorable, they can be changed in the central control, the correspondingly changed apparatus model being then memorized in the apparatus. In this arrangement, the changes to the apparatus model may relate not only to changes in the parameters but also to the software existing in each apparatus.

The invention now makes it possible to conceive and test industrial systems by simple ways and menus without it being necessary to run the apparatuses on-line which are usually large in number.

The invention claimed is:

1. In an industrial process including a central control unit, a bus and a plurality of field devices connected to the central control unit via the bus, a simulation arrangement including:
   a software apparatus model associated with at least one of the field devices, said software apparatus model being a mimic image of the field device with which said software apparatus model is associated, including parameters, functionalities and programs of the field device with which said software apparatus model is associated, wherein:
      said software apparatus model is stored in the field device with which said software apparatus model is associated,
      said software apparatus model is loadable via the bus in the central control unit, and
      the central control unit being provided with the parameters, functionalities and programs of the field device with which said software apparatus model is associated, so that the field device with which said software apparatus model is associated can be simulated in the central control unit.

2. The simulation arrangement as defined in claim 1, wherein:
   the software of said software apparatus model is formulated in a uniform program language with which said functionality and said parameters of field device with which said software apparatus is associated can be explicitly simulated in the central control unit.

3. The simulation arrangement as defined in claim 1, further including:
   a data carrier, wherein:
      said software is memorizable on said date carrier and usable by a software program in the central control unit.

4. A plant including:
   a central control unit, a bus and a plurality of apparatuses connected to the central control unit via the bus; and
   a simulation arrangement having an apparatus model associated with each apparatus, said apparatus model having memorized software which is a specification of the apparatus containing a mimic image including parameters, functionalities and programs of the apparatus, wherein:
      the software of each apparatus being loadable into said central control unit so that the operation of the plant can be simulated by testing all parameters and functionalities in said software.

5. The plant as defined in claim 4, wherein:
   said software are modifiable by said central control unit depending on the result of simulation.

6. A method of simulation the operation of a plant including a central control unit, a buss and at least one apparatus having memorized software which is a specification of the apparatus containing a mimic image of the apparatus, the mimic image including parameters, functionalities and programs of the apparatus, comprising the steps of:
   loading the software of the apparatuses to be employed in the plant into the central control unit; and
   simulating the operation of the plant by including all parameters and functionalities contained in the software by means of a software program sequence in the control unit.

7. The method as defined in claim 6, further comprising the step of:
   modifying any apparatus by the central control unit as a function of the result of said simulation.

8. A control unit used in an industrial process connected via a bus to at least one apparatus of the industrial process, comprising:
   means memorizing a software, said software being a specification of said at least one apparatus containing a mimic image of said at least one apparatus including parameters, functionalities and programs of said at least one apparatus, said software providing said control unit with said specification of said at least one apparatus.

9. The control unit as defined in claim 8, wherein said software is loaded from said apparatus into said control unit via said bus.

10. The control unit as defined in claim 9, wherein said control unit is connected via said bus with a plurality of apparatuses used in said industrial procedd.

* * * * *